(12) United States Patent
Lin et al.

(10) Patent No.: US 8,591,211 B2
(45) Date of Patent: Nov. 26, 2013

(54) GLASS REPAIRER

(71) Applicants: Yu-Hung Lin, Taichung (TW); Cheng-Tse Chang, Changhua County (TW)

(72) Inventors: Yu-Hung Lin, Taichung (TW); Cheng-Tse Chang, Changhua County (TW)

( * ) Notice: Subject to any disclaimer, the term of this patent is extended or adjusted under 35 U.S.C. 154(b) by 0 days.

(21) Appl. No.: 13/660,609

(22) Filed: Oct. 25, 2012

(65) Prior Publication Data

US 2013/0230612 A1 Sep. 5, 2013

(30) Foreign Application Priority Data

Mar. 2, 2012 (TW) .............................. 101203687 A

(51) Int. Cl.
*B29C 73/24* (2006.01)

(52) U.S. Cl.
USPC ............................................ 425/12; 425/13

(58) Field of Classification Search
USPC ................ 425/11, 12, 13; 264/36.21; 156/94
See application file for complete search history.

(56) References Cited

U.S. PATENT DOCUMENTS

| | | | | |
|---|---|---|---|---|
| 4,200,478 A | * | 4/1980 | Jacino et al. | 156/94 |
| 4,280,861 A | * | 7/1981 | Schwartz | 156/382 |
| 4,975,037 A | * | 12/1990 | Freiheit | 425/12 |
| 5,234,325 A | * | 8/1993 | Hill | 425/12 |
| 5,589,018 A | * | 12/1996 | Campfield | 156/94 |
| 5,622,726 A | * | 4/1997 | Tanner | 425/12 |
| 6,074,582 A | * | 6/2000 | Jacino et al. | 264/36.21 |
| 6,187,124 B1 | * | 2/2001 | Campfield | 156/94 |
| 6,485,281 B1 | * | 11/2002 | Curl | 425/12 |
| 8,092,203 B2 | * | 1/2012 | Boyle et al. | 425/12 |
| 2002/0031564 A1 | * | 3/2002 | Beveridge | 425/12 |
| 2002/0058080 A1 | * | 5/2002 | Curl | 425/12 |
| 2002/0100991 A1 | * | 8/2002 | Evans | 264/36.21 |
| 2004/0067272 A1 | * | 4/2004 | Evans | 425/12 |

* cited by examiner

*Primary Examiner* — Yogendra Gupta
*Assistant Examiner* — Emmanuel S Luk
(74) *Attorney, Agent, or Firm* — Banger Shia

(57) ABSTRACT

A glass repairer of the present invention includes a support base for fixation, a fluid-receiving tube, a pressing rod, and a rubber head for injecting repairing fluid. The fluid-receiving tube is disposed on the support base. The rubber head is fixed to an end of the pressing rod and is able to squeeze the repairing fluid in the fluid-receiving tube outward. Thereby, replenishing repairing fluid and cleaning become easier. Also, the present invention is able to be utilized repeatedly.

7 Claims, 5 Drawing Sheets

GLASS REPAIRER

BACKGROUND OF THE INVENTION

1. Field of the Invention

The present invention relates to a glass repairer.

2. Description of the Prior Art

A conventional glass repairer, as disclosed in TW 268404 and TW M334072, has a base having a suction disk to be temporally fixed onto a glass surface. Thereafter, the base is disposed with a pressured column and a rotating rod. The pressured column is adapted for receive repairing fluid for filling crevices on the glass surface. When the rotating rod is rotated by a user, the repairing fluid in the pressured column is squeezed out to fill the crevices.

As mentioned above, the rotating rod is screwed with the pressured column, and a tip of the rotating rod directly pushes the repairer fluid. Thus, the repairing fluid may enter the threads to make the rotating rod adhere to the pressured column, and the repairer is unable to operate.

To improve, in TW M279556, the tip of the rotating rod is disposed with a spring and a terminal piece. When the rotating rod moves, the terminal piece pushes the repairing fluid outward.

However, after using, when the rotating rod is rotated to move back, the terminal piece doesn't move back due to the spring abutting so that it is difficult to replenish the repairing fluid for using repeatedly.

SUMMARY OF THE INVENTION

The main object of the present invention is to provide a glass repairer which is able to abut against glass surface more tightly and to be used repeatedly.

To achieve the above and other objects, a glass repairer of the present invention includes a support base, a fluid-receiving tube, a pressing rod, a rubber head, and a rubber cover.

The support base has a seat and an arm. The seat is adapted for being temporally fixed on a glass surface. The arm extends from the seat, and a free end of the arm forms a threaded hole.

The fluid-receiving tube has a first section, a second section, and a third section. The second section connects the first section and the third section therebetween. The first section has internal threads, and the second section has external threads. The third section has a larger internal diameter than an internal diameter of the second diameter. The fluid-receiving tube is inserted through and screwed with the threaded hole. The third section further includes an annular stepped portion, an inner tube, and an outer tube. The stepped portion is connected with the second section, and the inner tube and the outer tube are connected with the stepped portion respectively. The inner tube is located in the outer tube, and an annular room is enclosed by the stepped portion, the inner tube, and the outer tube wherein the annular room is separated from the second section. The annular room has a reduced section close to the second section and a widened section away from the second section so that a first stepped face is formed between the reduced section and the widened section. Particularly, the inner tube has a length equal to a length of the outer tube.

The pressing rod has external threads. An end of the pressing rod forms a driving head, an opposite end of the pressing rod forms a fixing portion. The fixing portion is inserted into the fluid-receiving tube, and the pressing rod is screwed with the first section.

The rubber head is received in the second section of the fluid-receiving tube and is fixed to the fixing portion so as to move with the pressing rod. The pressing rod is able to move along the fluid-receiving tube when rotated so that the rubber head is able to move toward the third section to squeeze repairing fluid in the second and the third sections outward via the third section.

The rubber cover has a widened portion and a reduced portion at opposite two ends wherein the widened portion having a larger external diameter than an external diameter of the reduced portion. A second stepped face being formed between the widened portion and the reduced portion. The rubber cover further forms a through hole axially penetrating the reduced portion and the widened portion. The through hole has an internal diameter larger than or equal to an external diameter of the inner tube. An end of the rubber cover having the reduced portion is inserted into the annular room so that the reduced portion is located in the reduced section, that the widened portion is located in the widened section, that the inner tube is received in the through hole, and that the second stepped face abuts against the first stepped face. The rubber cover further has a bottom portion having an external diameter larger than the internal diameter of the widened section of the annular room. The bottom portion is located at an end of the widened portion away from the reduced portion and abuts against the third section of the fluid-receiving tube.

Thereby, a user can rotate the pressing rod to move the pressing rod and to drive the rubber head to move. When the rubber head is moved toward the third section, the repairing fluid is squeezed outward. After used, the rubber head can be drawn back and removed from the fluid-receiving tube with the pressing rod so that the fluid-receiving tube is able to be cleaned or replenished with repairing fluid. Besides, the rubber cover received in the annular room helps abutting against glass surface more tightly. Moreover, the rubber cover is able to be compressed for further abutting. Even if the rubber cover is compressed, the channel which repairing fluid flows through may not be shrunk or blocked.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
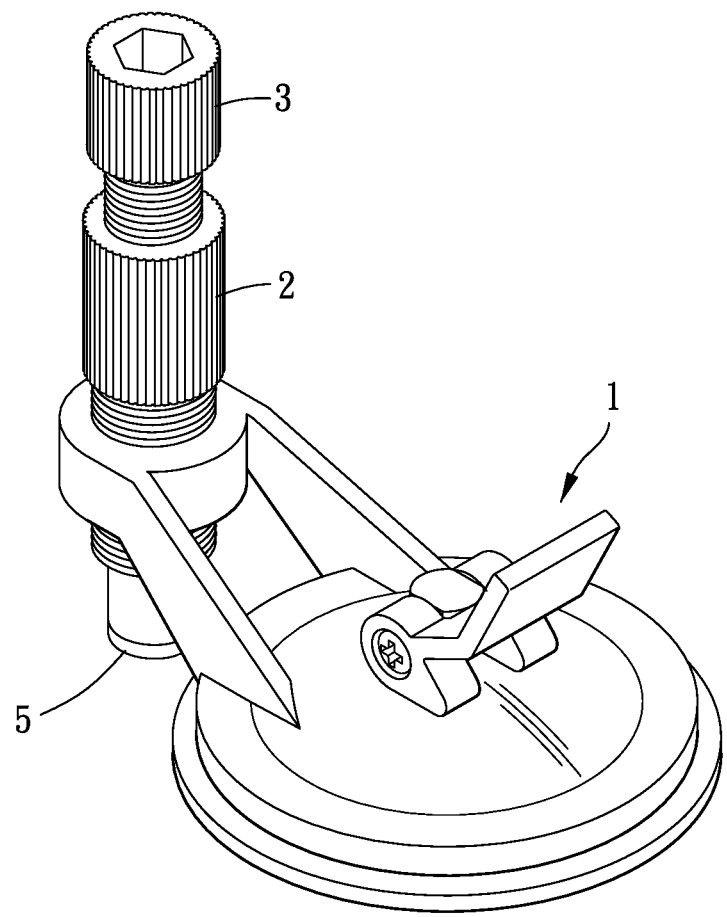
FIG. 1 is a stereogram of the present invention.
Figure 2:
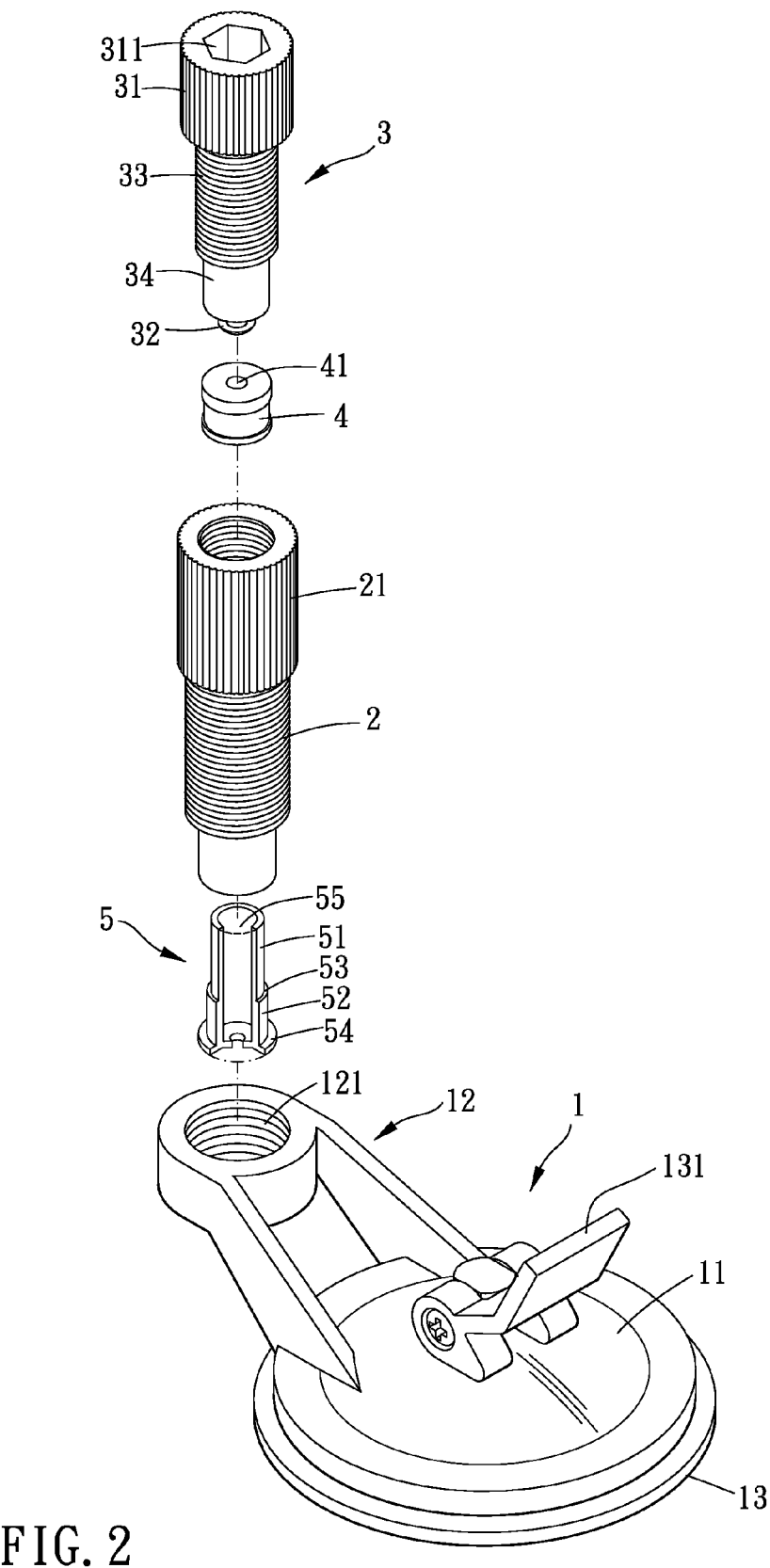
FIG. 2 is a breakdown drawing showing of the present invention.
Figure 3:
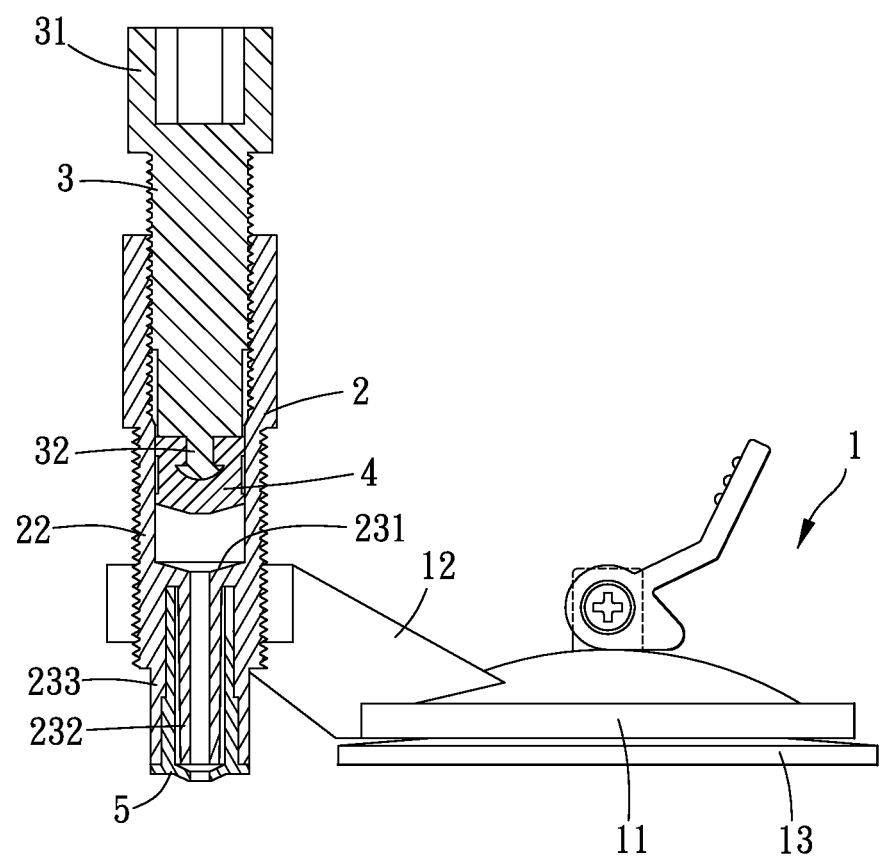
FIG. 3 is a profile of the present invention.

Please refer to FIG. 1 to FIG. 3. The glass repairer of the present invention is adapted for squeezing repairing fluid out and filling crevices on glass surface. The glass repairer includes a support base 1, a fluid-receiving tube 2, a pressing rod 3, a rubber head 4, and a rubber cover 5.

The support base 1 has a seat 11 and an arm 12. The seat 11 adapted for being temporally fixed onto a glass surface, more preferably, is disposed with a suction disk 13 to adhere onto the glass surface downward. In addition, the suction disk 13 further has a compelling device 131 which is able to abut against the seat 11 to pull an intermediate portion of the suction disk 13 upward so that a space between the suction disk 13 and the glass surface is under a low pressure or a vacuum state. Thus, the suction disk 13 is pushed by atmospheric pressure so as to adhere onto the glass surface tightly. The arm 12 extends from the seat 11, and a threaded hole 121 is formed at a free end of the arm 12. More preferably, an axial direction of the threaded hole 121 is perpendicular to the glass surface. Besides, if sufficient structure strength is provided, the arm 12 can be partially hollow, as shown in FIGS. 1 and 2.

Figure 4:
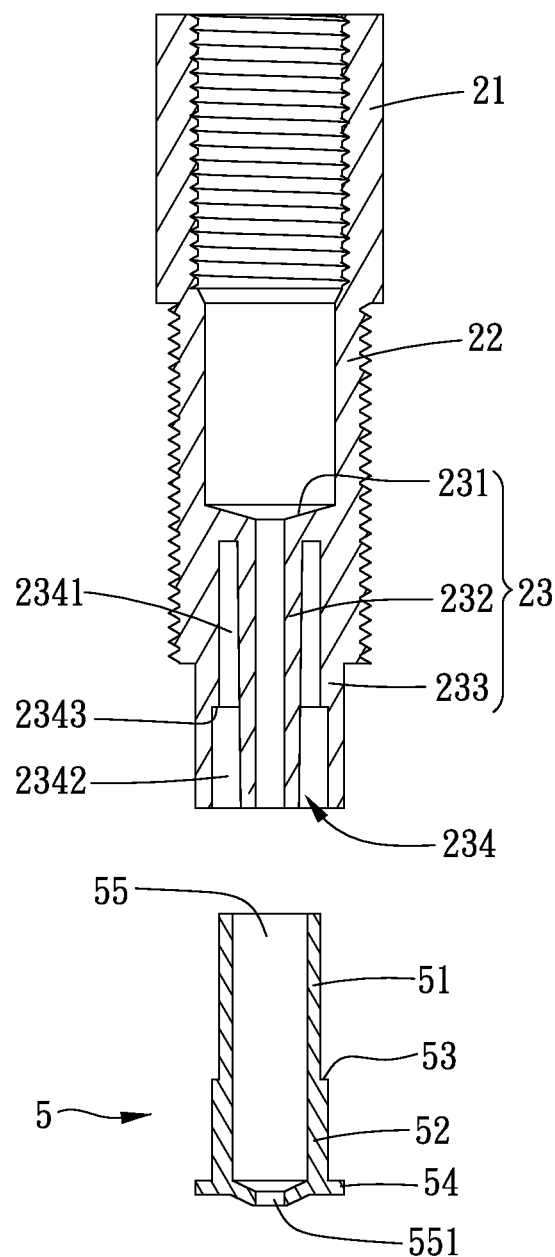
FIG. 4 is a profile showing a fluid-receiving tube and a rubber cover of the present invention.

Please refer to FIG. 2 and FIG. 4, the fluid-receiving tube 2 has a first section 21, a second section 22, and a third section 23. The first section 21 has internal threads and optionally forms concave and convex patterns for a user to grip onto and to rotate. Alternatively, the first section has a polygonal contour. The second section 22 connects the first section 21 and the third section 23 therebetween. The second section 22 has external threads, and an interior of the second section 22 is adapted for receiving repairing fluid. More preferably, the second section 22 has a smooth inner surface to prevent repairing fluid from adhering onto the inner surface of the second section 22. The third section 23 has a smaller internal diameter than an internal diameter of the second section 22. More specifically, the third section 23 has an annular stepped portion 231, an inner tube 232, and an outer tube 233. The stepped portion 231 is connected with the second section 22, and the inner tube 232 and the outer tube 233 are connected with the stepped portion 231 respectively. The inner tube 232 is located with the outer tube 233 so that an annular room 234 is enclosed by the stepped portion 231, the inner tube 232, and the outer tube 233. The annular room 234 surrounds the inner tube 232, and the annular room is separated from the second section 22 by the stepped portion 231. The annular room 234 has a reduced section 2341 close to the second section 22 and a widened section 2342 away from the second section 22. The reduced section 2341 has an internal diameter smaller than an internal diameter of the widened section 2342 so that a first stepped face 2343 is formed between the reduced section 2341 and the widened section 2342. Optionally, a face of the stepped portion 231 facing the second section 22 forms a conical concave face as a funnel. Free ends of the inner tube 232 and the outer tube 233 away from the stepped portion are open, and the outer tube 233 has a length equal to a length of the inner tube 232. On the other hand, the outer tube 233 forms external threads connected with the external threads of the second section 22. Please refer to FIGS. 1 to 3, the fluid-receiving tube 2 is inserted into and screwed with the threaded hole 121 of the support base so that the fluid-receiving tube 2 is able to move relative to the support base 1 along the axial direction when being rotated.

The pressing rod 3 forms a driving head 31 at an end. An outer surface of the driving head 31 forms concave and convex patterns and optionally a polygonal hole 311 for being rotated by tools or manually. An opposite end of the pressing rod 3 forms a fixing portion 32 which is substantially a rod having an expanding tip. The pressing rod 3 further forms external threads. More specifically, the pressing rod 3 has a threaded section 33 and a smooth section 34 wherein the smooth section 34 connects the threaded section 33 and the fixing portion 34 therebetween. An end of the pressing rod 3 having the fixing portion 32 is inserted into the fluid-receiving tube 2 and is screwed with the first section 21 so that the pressing rod 3 is able to move relative to the fluid-receiving tube 2 along the axial direction when being rotated.

The rubber head 4 is fixed with the fixing portion 32 and is able to move with the pressing rod 3. More specifically, the rubber head 4 forms a groove 41, and the fixing portion 32 is inserted into and fixed to the groove 41. Alternatively, the rubber head forms a rod, and the fixing portion forms a groove. The rubber head 4 is received in the second section 22 of the fluid-receiving tube 2 with the fixing portion 32. Particularly, the rubber head 4 is resilient and has a predetermined appropriate size so that the rubber head 4 is able to abut against the inner surface of the second section 22 tightly. When the pressing rod 3 is rotated and moved along the fluid-receiving tube 2, the pressing rod 3 drives the rubber head 4 to move toward the third section 23 so as to squeeze repairing fluid in the second section 22 and the third section 23 outward via the inner tube 232 of the third section. Preferably, the rubber head 4 forms a conical face at a side near the third section 23, and a tip of the conical face faces to the third section 23. Thus, the conical face of the rubber head 4 has a shape corresponding to the one of the stepped portion 231. Thereby, when the rubber head 4 moves toward the third section 23 and abuts against the stepped portion 231, the rubber head 4 contacts with the stepped portion 231 tightly to squeeze the repairing fluid out completely.

Please refer to FIGS. 2 and 4. The rubber cover 5 is resilient and has a widened portion 52 and a reduced portion 51 at opposite two ends. The widened portion 52 has a larger internal diameter than an internal diameter of the reduced portion 51 so that a second stepped face 53 is formed between the reduced portion 51 and the widened portion 52. The rubber cover 5 further forms through hole 55 axially penetrating the reduced portion 51 and the widened portion 52. An internal diameter of the through hole 55 is equal to or larger than an external diameter of the inner tube 232. An end of the rubber cover 5 having the reduced portion 51 is inserted into the annular room 234 so that the reduced portion 51 is located in the reduced section 2341, that the widened portion 52 is located in the widened section 2342, that the inner tube 232 is received in the through hole 55, and that the second stepped face 53 abuts against the first stepped face 2343. The rubber cover 5 further has a bottom portion 54 having an external diameter larger than the internal diameter of the widened section 2342. The bottom portion 54 is located at end of the widened portion 52 away from the reduced portion 51 and abuts against the third section 23 of the fluid-receiving tube 2. More specifically, an end of the though hole 55 away from the second section 22 has an opening 551 having an internal diameter smaller than the one of the though hole 55. The internal diameter of the opening 55 is substantially equal to an internal diameter of the inner tube 232 so that repairing fluid is able to flow out through the inner tube 232 and the opening 551. More preferably, a circumference of the opening 551 is protruded away from the reduced portion 51, and a gap is formed between the bottom portion 54 of the rubber cover 5 and the inner tube 232 for receiving the bottom portion 54 which is compressed and deformed.

Please refer to FIG. 3, before using, the pressing rod can be rotated to be away from the third section or further be removed from the fluid-receiving tube with the rubber head 4, and the repairing fluid can be replenished into the second section. Please refer to FIG. 5, when using, the pressing rod 3 is rotated and moved toward the third section 23, and the rubber head 4 squeezes the repairing fluid out via the free end of the inner tube 232 of the third section. After using, the pressing rod 3 can be rotated reversely to be moved back or be removed for preventing repairing fluid from adhering the pressing rod 3 and the fluid-receiving tube 2, so the present invention can be utilized repeatedly.

Figure 5:
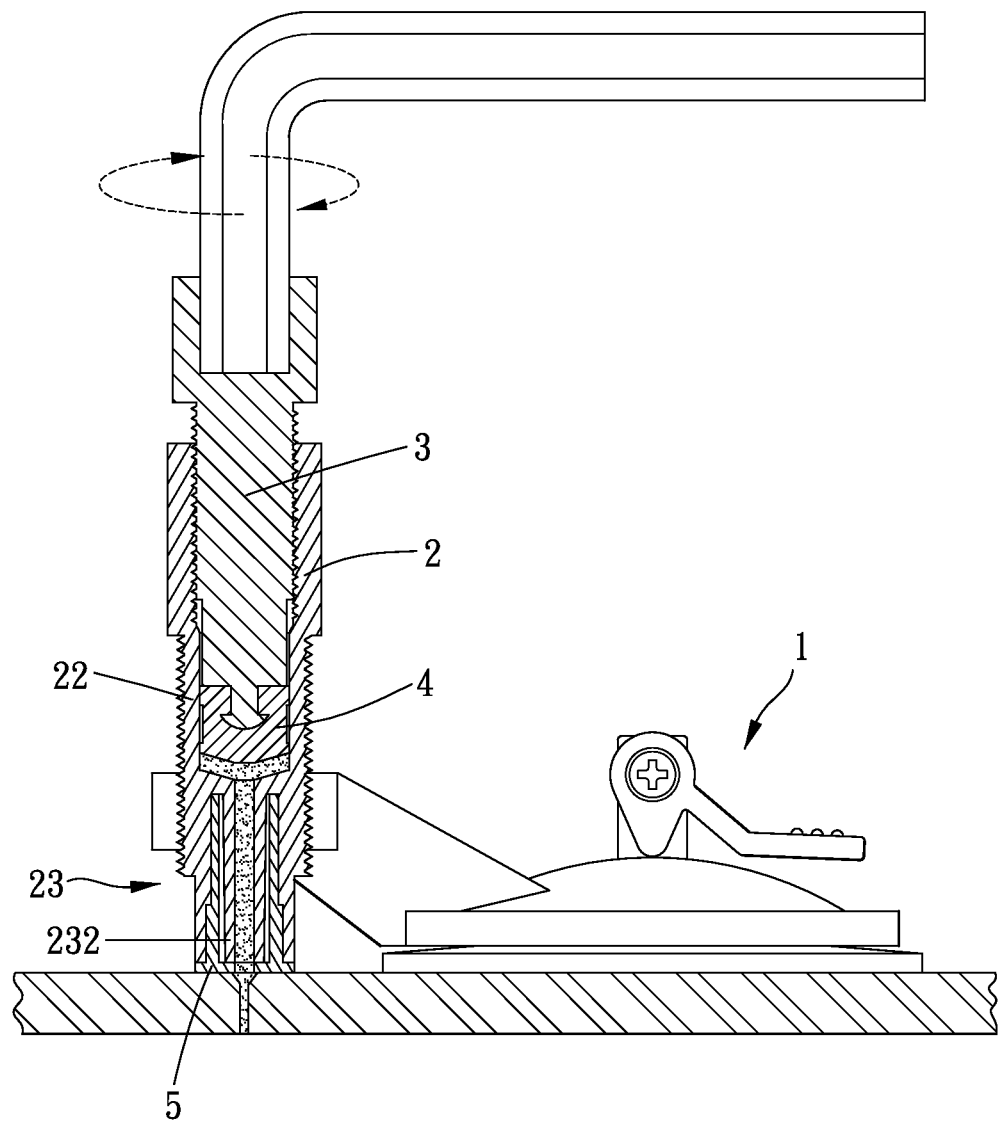
FIG. 5 is an illustration of the present invention.

Please refer to FIGS. 4 and 5. The rubber cover 5 is able to abut against glass surface tightly, or to be further compressed to abut against glass surface more tightly. Also, the rubber cover 5 is received in the annular room 234 to obtain a better support and positioning. More importantly, when the rubber cover 5 is compressed and deformed, the through hole 55 may not be shrunk and reduced due to the inner tube 232 blocking so as to ensure the repairing fluid flowing unhinderedly. In addition, only the opening 551 of the rubber cover 5 contacts with the repairing fluid directly so as to facilitate cleaning and to reduce adhering on the rubber cover.

Besides, the third section has a smaller diameter, so repairing fluid may be solidified from an end of the third section 23 away from the second section 22. Thus, if the repairing fluid is going to be solidified, the solidified repairing fluid can be removed from the end of the third section 23 or the annular room or by rotating the pressing rod 3 to drive the repairing fluid in the second section 22 to push the solidified repairing fluid away. Thus, the present invention can function repeatedly.

Thereby, the glass repairer of the present invention is easy to be replenished with repairing fluid and to be cleaned. Furthermore, the third section facilitates filling the repairing fluid into crevices of the glass surface and prevents the fluid-receiving tube from jamming.

What is claimed is:

1. A glass repairer, including:
    a support base, having a seat and an arm, the seat being adapted for being fixed to a glass surface temporally, the arm extending from the seat, a free end of the arm forming a threaded hole;
    a fluid-receiving tube, having a first section, a second section, and a third section, the second section connecting the first section and the third section therebetween, the first section having internal threads, the second section having external threads, an internal diameter of the third section being smaller than an internal diameter of the second section, the fluid-receiving tube being inserted through and screwed with the threaded hole, the third section further including an annular stepped portion, an inner tube, and an outer tube, the stepped portion being connected with the second section, the inner tube and the outer tube being connected with the stepped portion respectively, the inner tube being located in the outer tube, an annular room being enclosed by the stepped portion, the inner tube, and the outer tube, the annular room being separated from the second section and having a reduced section close to the second section and a widened section away from the second section, the reduced section having an internal diameter smaller than an internal diameter of the widened section so that a first stepped face is formed between the reduced section and the widened section, the inner tube having a length equal to a length of the outer tube so that the inner tube communicates with the annular room in the outer tube;
    a pressing rod, having external threads, a driving head being formed at an end of the pressing rod, a fixing portion being formed at an opposite end of the pressing rod, the fixing portion being inserted into the fluid-receiving tube, the pressing rod being screwed with the first section;
    a rubber head, being received in the second section of the fluid-receiving tube, the rubber head being engaged with the fixing portion so as to move with the pressing rod;
    a rubber cover, having a widened portion and a reduced portion at opposite two ends, the widened portion having a larger external diameter than an external diameter of the reduced portion, a second stepped face being formed between the widened portion and the reduced portion, the rubber cover further forming a through hole axially penetrating the reduced portion and the widened portion, the through hole having an internal diameter larger than or equal to an external diameter of the inner tube, an end of the rubber cover having the reduced portion being inserted into the annular room so that the reduced portion is located in the reduced section, that the widened portion is located in the widened section, that the inner tube is received in the through hole, and that the second stepped face abuts against the first stepped face, the rubber cover further having a bottom portion having an external diameter larger than the internal diameter of the widened section of the annular room, the bottom portion being located at an end of the widened portion away from the reduced portion and abutting against the third section of the fluid-receiving tube;
    wherein the pressing rod moves along the fluid-receiving tube when being rotated so that the rubber head is able to move toward the third section to squeeze fluid in the second and the third sections outward via the third section.

2. The glass repairer of claim 1, wherein the fixing portion is rod-shaped and has an expanding end, the rubber head has a groove, the fixing portion is inserted into and fixed to the groove.

3. The glass repairer of claim 1, wherein the rubber head forms a conical face, a tip of the conical face facing toward the third section, the stepped portion has a shape corresponding to the conical face.

4. The glass repairer of claim 1, wherein the pressing rod has a threaded section and a smooth section, the smooth section connects the fixing portion and the threaded section therebetween.

5. The glass repairer of claim 1, wherein an outer wall of the outer tube forms external threads connected with the second section.

6. The glass repairer of claim 1, wherein an end of the through hole away from the reduced portion has an opening, the opening has an internal diameter smaller than the one of the through hole but substantially equal to an internal diameter of the inner tube.

7. The glass repairer of claim 6, wherein a circumference of the opening is protruded away from the reduced portion.

* * * * *